United States Patent [19]

Yokota

[11] Patent Number: 4,982,397
[45] Date of Patent: Jan. 1, 1991

[54] APPARATUS FOR FOCUSING A LIGHT BEAM ONTO AN INFORMATION MEMORY MEDIUM HAVING A DATA NON-STORAGE AREA

[75] Inventor: Tsuneshi Yokota, Kawasaki, Japan

[73] Assignee: Kabushiki Kaisha Toshiba, Kawasaki, Japan

[21] Appl. No.: 277,608

[22] Filed: Nov. 29, 1988

[30] Foreign Application Priority Data

| Nov. 30, 1987 | [JP] | Japan | 62-302651 |
| Nov. 30, 1987 | [JP] | Japan | 62-302652 |
| Nov. 30, 1987 | [JP] | Japan | 62-302668 |
| Nov. 30, 1987 | [JP] | Japan | 62-302675 |

[51] Int. Cl.$^5$ ............................................. G11B 7/00
[52] U.S. Cl. ..................................... 369/116; 369/54; 369/56; 369/44.32
[58] Field of Search ................... 369/43–47, 369/100, 116, 53–58, 44.32; 346/76 L, 135.1

[56] References Cited

U.S. PATENT DOCUMENTS

| 4,499,571 | 2/1985 | Yokota | 369/54 |
| 4,570,251 | 2/1986 | Yokota et al. | 369/116 X |
| 4,669,077 | 5/1987 | Gerard et al. | 369/46 X |
| 4,754,460 | 6/1988 | Kimura et al. | 369/116 X |
| 4,858,219 | 8/1989 | Yoshikawa et al. | 369/116 |

Primary Examiner—Robert L. Richardson
Attorney, Agent, or Firm—Finnegan, Henderson, Farabow, Garrett and Dunner

[57] ABSTRACT

In the initial operation phase of a data recording apparatus, a controller detects the output signal of a position detector, thus determining whether or not a data objective lens of an optical head is facing the non-storage region of an optical disk. If the lens faces the data non-storage region, the controller turns on a semiconductor laser, whereby the laser emits a laser beam onto the disk. The lens is moved in its axial direction, thereby focusing the beam. The beam emitted from the laser is detected by photodetectors. If this beam is too intense, the controller turns off the laser.

8 Claims, 5 Drawing Sheets

APPARATUS FOR FOCUSING A LIGHT BEAM ONTO AN INFORMATION MEMORY MEDIUM HAVING A DATA NON-STORAGE AREA

BACKGROUND OF THE INVENTION

1. Field of the Invention

The present invention relates to an apparatus for focusing a light beam onto an information memory medium, and more particularly, to an apparatus which prevents a destruction of the data recorded on the medium, during initial operation.

2. Description of the Related Art

Optical disks are classified into two types. The first type is called a write-once disk, and the second type is called an erasable disk. Data is recorded on either type of an optical disk by means of a data recording apparatus which has an optical head including, for example, a semiconductor laser, and an objective lens. More specifically, the laser beam which the semiconductor laser emits is applied to the optical disk, thereby recording the data thereon.

The optical head must not be turned on to cause the laser to emit a laser beam, before the following conditions are checked and confirmed:

1. The cover of the data recording apparatus is closed, preventing the laser beam from leaking from the apparatus to harm the operator of the apparatus.
2. The optical disk is placed at the prescribed position within the data recording apparatus.
3. The optical disk is spinning at a predetermined speed.

After all these conditions have been confirmed, the optical head is turned on to emit a laser beam, and the focus servo unit is operated, thus driving the objective lens so as to focus the laser beam on the optical disk correctly. When the initial-phase operation, such as the driving of the objective lens for focusing the beam, is started, it is not ascertained where the optical head is located with respect to the optical disk. Thus, the objective lens is driven, whether or not the optical head faces the data-recording region of the optical disk. Hence, if the lens faces the datarecording region, and if the focus servo unit fails to function appropriately, the objective lens will collide with the data recording region of the optical disk, inevitably destroying the data recorded on the disk.

The data recorded on the optical disk may be destroyed by another cause. As is known, a laser beam of a relatively low intensity is applied to the disk, either the write-once type or the erasable type, to reproduce data therefrom, and a laser beam of a relatively high intensity is applied to the disk to record the data thereon. If the laser emits an intense beam by accident while the optical head is facing the data-recording region of the disk in the initial operation phase of the head, this beam will destroy the data recorded on the part of the disk which it illuminates and which must be saved. Unless the laser is immediately turned off, it continues to emit the intense beam onto the data-recording region, inevitably destroying more and more data as the disk spins.

SUMMARY OF THE INVENTION

The first object of the invention is to provide an apparatus for focusing a light beam onto an information memory medium which does not destroy the data recorded on an optical disk when the laser incorporated in an optical head is driven, thus emitting a laser beam, in the initial operation phase of the optical head.

The second object of the present invention is to provide an apparatus for focusing a light beam onto an information memory medium which does not destroy the data recorded on an optical disk when the focus servo unit incorporated in an optical head is driven in the initial operation phase of the optical head.

The third object of the invention is to provide an apparatus for focusing a light beam onto an information memory medium which does not destroy data recorded on an optical disk in the initial operation phase of an optical head, by detecting whether or not the laser is emitting an excessively intense beam, and by turning off the laser as soon an emission of such an intense beam is detected, thereby preventing the data recorded on the optical disk from being destroyed.

According to the invention there is provided an apparatus for focusing a light beam onto an information memory medium having a data non-storage area, the apparatus comprising:

means for directing the light beam toward the medium, the directing means having means for generating the light beam;

means for moving the directing means in parallel to the medium;

means for detecting the existence of the data non-storage area of the medium while the directing means is moved by the moving means; and means responsive to the detecting means for activating the generating means so as to generate the light beam.

Further, according to the invention, there is provided an apparatus for focusing a light beam onto an information memory medium having a data non-storage area, the apparatus comprising:

means for directing the light beam toward the medium;

means for moving the directing means in parallel to the medium;

means for detecting the existence of the data non-storage area of the medium while the directing means is moved by the moving means; and means responsive to the detecting means for adjusting the location of the directing means with respect to the medium.

According to the invention, there is further provided an apparatus for focusing a light beam onto an information memory medium having a data non-storage area, the apparatus comprising:

means for directing the light beam toward the medium, the directing means having means for generating the light beam;

means for moving the directing means in parallel to the medium;

means for detecting the existence of the data non-storage area of the medium while the directing means is moved by the moving means;

means responsive to the detecting means for activating the generating means so as to generate the light beam;

means for detecting the intensity of the light beam; and means for disabling the generating means when the output of the intensity detecting means is greater than a predetermined value.

DETAILED DESCRIPTION OF THE PREFERRED EMBODIMENTS

An embodiment of the present invention will be described, with reference to the accompanying drawings.

Figure 1:
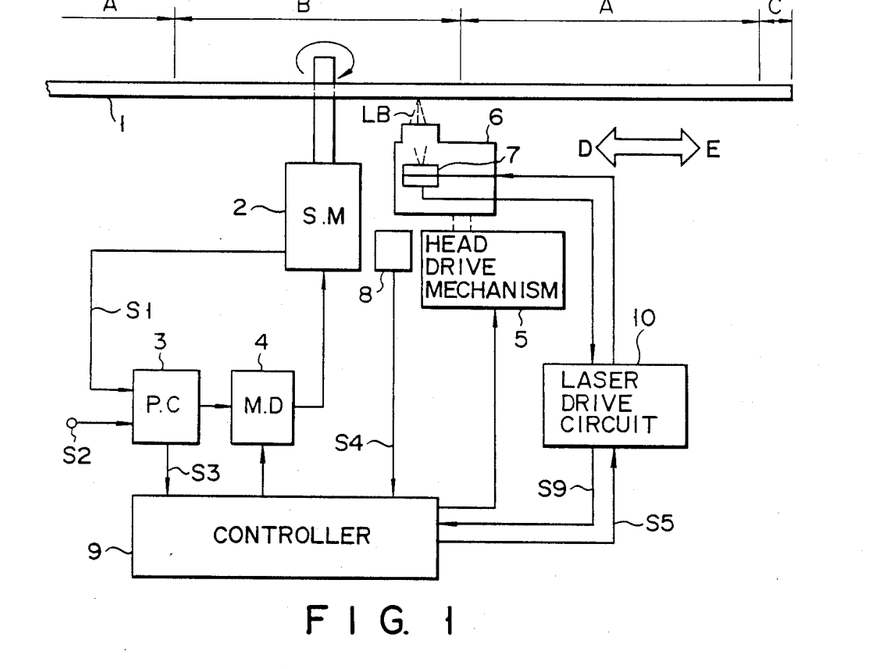
FIG. 1 is a diagram schematically showing an apparatus for focusing a light beam onto an information memory medium according to a first embodiment of the invention.

An apparatus for focusing a light beam onto an information memory medium according to this embodiment is designed to record data on optical disk 1 and reproduce data therefrom. As is shown in FIG. 1, optical disk 1 comprised a circular base plate made of glass or plastics, and layer of a metal such as tellurium (T) or bismuth (Bi), coated on one surface of the base. The surface of disk 1 consists of data-storage region A, first data non-storage region B, and second data non-storage region C. Data non-storage region A is doughnut-shaped. First data non-storage region B is circular and surrounded by data-storage region A. Second data non-storage region C is doughnut-shaped, and surrounds data-storage region A. A spiral recording track (not shown) or concentric recording tracks (not shown, either) is formed on data-storage region A.

Optical disk 1 is rotated by spindle motor (S.M.) 2. Motor 2 includes a pulse generator (not shown) for generating pulse signal S1, whose frequency is proportional to the speed of spindle motor 2. Pulse signal S1 is supplied by phase comparator (P.C.) 3. Phase comparator 3 compares the phase of pulse signal S1 with that of reference signal P2 supplied from a reference-frequency generator (not shown), thus detecting the phase difference, if any, between signal S1 and S2. Comparator 2 supplies the data representing this phase difference to motor driver (M.D.) 4. Motor driver 4 generates an acceleration signal or a deceleration signal, in accordance with the data output by comparator 2. More specifically, when signal S1 has a frequency lower than that of reference signal P2, motor driver 4 supplies an acceleration signal to spindle motor 1; when signal S1 has a frequency higher than that of reference signal P2, motor driver 4 supplies a deceleration signal to spindle motor 1; and when signal S1 has the frequency equal to that of reference signal P2, motor driver 4 supplies neither an acceleration signal nor a deceleration signal to spindle motor 1. In accordance with the acceleration signal, motor driver 4 drives spindle motor 1 at a speed higher than before.

When phase comparator 3 detects that signal S1 has the same frequency as reference signal S2, it generates signal S3 which represents this fact. Signal S3 is supplied to controller 9, which will be described later.

Optical head 6 is located below optical disk 1, for recording data on disk 1 or reproducing the data therefrom. Optical head 6 comprises semiconductor laser 7. It is moved by head drive mechanism 5 in the radial direction D or E of optical disk 1, thereby to record data on disk 1 or reproduce the data from disk 1. Head drive mechanism 5 includes, for example, a linear motor. The linear motor comprises a drive coil which is movable and connected to optical head 6, and a permanent magnet which functions as a stator. When excited by the control signal supplied from controller 9, the drive coil moves in the radial direction of optical disk 1, thus moving optical head 6 in the same direction.

Position detector 8 is located below optical disk 1, more precisely below first data non-storage region B of disk 1. Detector 8 is made of a photo-interrupter for detecting whether or not the laser beam emitted by optical head 6 is applied to first data non-storage region B.

Figure 2:
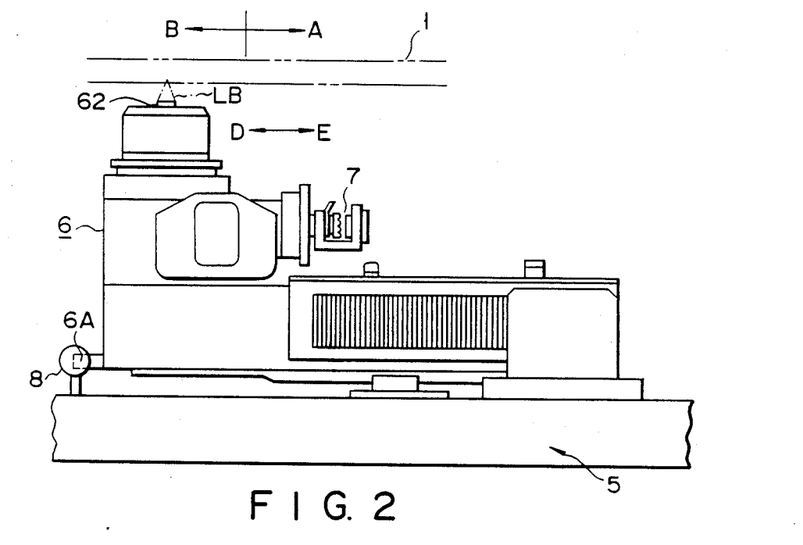
FIG. 2 is a side view of the apparatus shown in FIG. 1, illustrating the main components of the apparatus, including a position detector, and explaining where the position detector is located.

As is shown in FIG. 2, the laser beam LB emitted through the objective lens 62 of head 6 forms a spot on optical disk 1. Member 6A is attached to one side of optical head 6, such that it comes into the optical path of position detector 8 the moment the beam spot moves to first data non-storage region B. When member 6A interrupts the optical path of detector 8, detector 8 generates position signal S4. Position signal S4 is supplied to controller 9.

Controller 9, which is shown in FIG. 1, comprises a memory and a CPU. The memory stores the program shown in FIG. 5 and other data. Controller 9 controls the other various components of the data recording apparatus. Controller 9 determines, from signal S4 output by phase comparator 3, that optical disk 1 is spinning at a predetermined speed. It also determines, from position signal S4, that optical head 6 opposes first data non-storage region B of disk 1, or is located at its initial position.

When controller 9 receives signal S3 from phase comparator 3 and also position signal S4 from position detector 8, it controls laser drive circuit 10, which causes semiconductor laser 7 to emit a laser beam LB. If controller 9 has not received position signal S4, it controls head drive mechanism 5 such that mechanism 5 moves optical head 6 in the direction of arrow D until position detector 8 supplied position signal S4 to controller 9. Controller 9 also generates control data for driving objective lens 62, thereby to focus the laser beam onto optical disk 1. In other words, controller 9 serves to achieve the initial phase of the focus servo, as will be described later.

An apparatus for focusing the beam onto an information memory medium shown in FIG. 1 will now be described in greater detail, with reference to FIG. 3.

Figure 3:
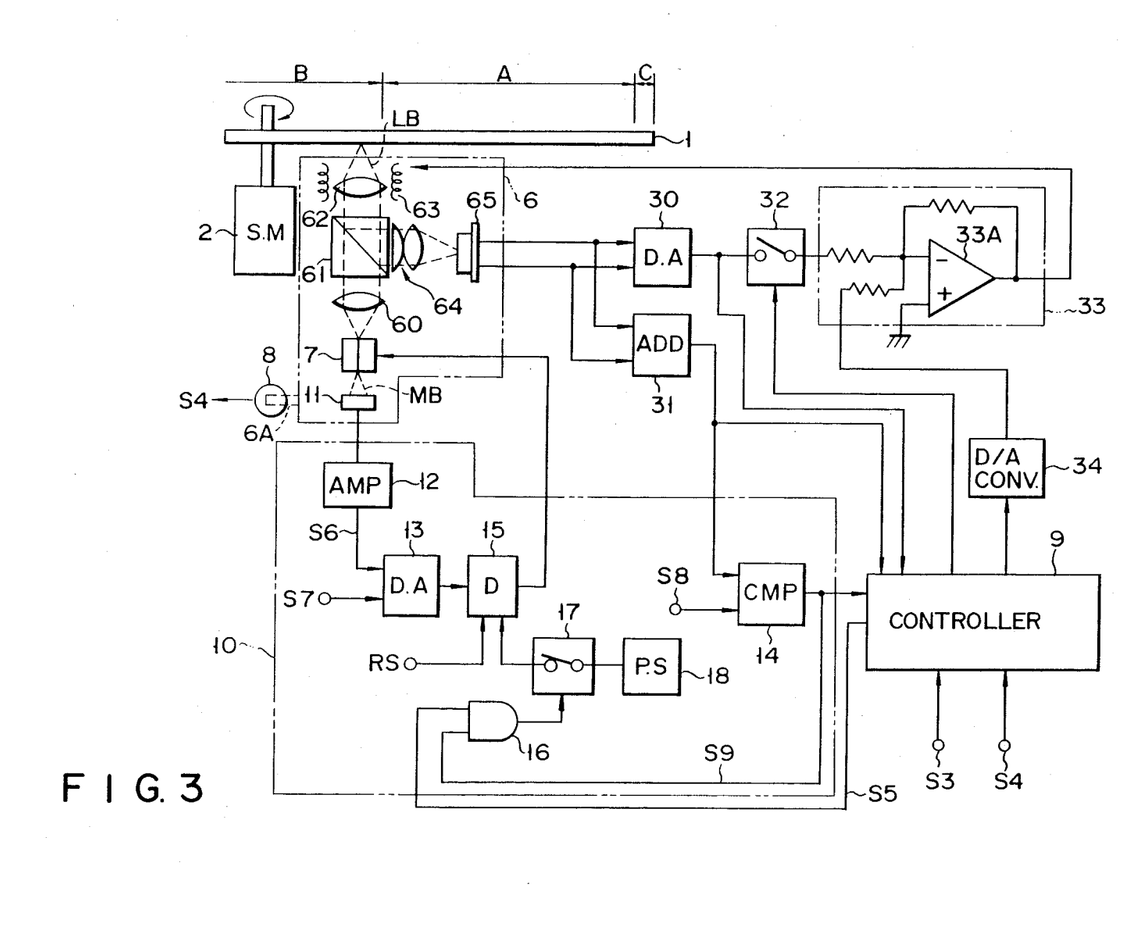
FIG. 3 is a block diagram of the apparatus shown in FIG. 1, illustrating the apparatus in greater detail.

As is shown in FIG. 3, optical head 6 comprises semiconductor laser 7, photoconductor 11 located below laser 7, collimator lens 60 located above laser 7, polarizing beam splitter 61 provided above lens 60, objective lens 62 positioned above beam splitter 61, drive coil 63 surrounding lens 62, projection lenses 64 placed beside beam splitter 61, and photodetector 65.

Also as is illustrated in FIG. 3, laser drive circuit 10 comprises amplifier (AMP) 12, connected to the output of photodetector 11 of head 6, differential amplifier (D.A.) 13 whose first input is connected to output of amplifier 12, comparator (CMP) 14, driver 15 connected at output to differential amplifier 13 and at output to semiconductor laser 7, two-input AND gate 16, switch 17 connected to driver 15 and also the output of AND gate 16, and power source (P.S.) 18 connected to switch 17.

Photodetector 65 of optical head 6 has two photocells. The outputs of these photocells are connected to differential amplifier (D.A.) 30 and also to addition circuit (ADD) 31. The output of addition circuit 31 is connected to controller 9 and the first input of comparator 14 of laser drive circuit 10. The output of differential amplifier 30 is coupled to controller 9 and the fixed contact of switch 32. The movable contact of switch 32 is connected to driver 33. Driver 33 is designed to supply a current to drive coil 63 of optical head 6, and comprises operational amplifier 33A. The input of operational amplifier 33A is connected to D/A converter (D/A CONV) 34. D/A converter 34 is connected to controller 9.

To reproduce data from optical disk 1, semiconductor laser 7 emits a laser beam having a predetermined intensity, under the control of driver 15 of laser drive circuit 10. The record data RS on optical disk 1, data RS is supplied to driver 15. Driver 15 drives laser 7 in accordance with data RS, whereby laser 7 emits a laser beam having an intensity which has been modulated by data RS and is higher than that of the beam applied to disk 1 to reproduce data therefrom.

The beam emitted from laser 7, either a data-reproducing one or a data-recording one, is a diverging beam. Collimator lens 60 converts the beam into one having the same diameter over its entire length. The beam from lens 60 is supplied to polarizing beam splitter 61. The beam passes through beam splitter 61 and is focused by objective lens 62 onto the recording layer of disk 1.

Objective lens 62 is supported by a support (not shown), so that it may move along its axis and in the direction at right angles to its axis, driven by drive coil 63. When lens 62 is moved to a predetermined position, it focuses the beam such that the beam forms the smallest light spot on the recording one having the same diameter over its entire length. layer of disk 1, and is in a so-called "on-track" condition. As a result, optical head 6 can record data on disk 1 or reproduce data therefrom.

The laser beam is reflected from the recording layer of optical disk 1. The reflected beam, which is a diverging one, is focused by objective lens 62 into one having the same diameter over its entire length. The beam output by lens 62 is supplied to polarizing beam splitter 61. Beam splitter 61 guides the beam to projection lenses 64. Lenses 64 focus the beam onto photodetector 65.

The photocells of photodetector 65 converts the incoming beam into electric signals. These signals are supplied to differential amplifier 30 and also to addition circuit 31. Addition circuit 31 combines these signals, thus forming a sum signal. The sum signal is supplied to controller 9 and comparator 14. Comparator 14 uses the sum signal to determine whether or not semiconductor laser 7 has emitted too intense a laser beam, and whether or not the beam has been in the "on-track" condition.

In the meantime, photodetector 11, which is located below laser 7, receives monitor light from laser 7 and converts the monitor light into an electric signal. This signal is supplied to amplifier 12 of laser drive circuit 10. Amplifier 12 amplifies the signal, and the amplified signal is supplied to differential amplifier 13. Differential amplifier 13 compares the signal with reference signal S7 supplied from a constant voltage source (not shown), and amplifies the difference between the two signals. The amplified difference signal is input to driver 15. Driver 15 drives semiconductor laser 7 in accordance with the signal supplied from differential amplifier 13. Power is supplied to driver 15 from power source 18 as long as switch 17 remains closed.

Comparator 14 incorporated in laser drive circuit 10 compares the output voltage of addition circuit 31 with reference voltage S8 applied from a constant voltage source (not shown). This voltage S8 corresponds to the maximum intensity which the laser beam may have not to destroy the data recorded on disk 1 when it is applied to disk 1. Comparator 14 outputs signal S9 when the output voltage of addition circuit 31 is higher than reference voltage S8. This signal S9 is supplied to the first input of AND gate 16. Signal S5 is supplied from controller 9 to the second input of AND gate 16. Hence, AND gate 16 supplies a signal to switch 17, thereby turning off this switch 17. Thus, the power supply from power source 18 to driver 15 is stopped. When the output voltage of addition circuit 31 is equal to or lower than reference voltage S8, comparator 14 generates no output signals, and AND gate 16 outputs no signals. In this case, switch 17 remains closed, whereby the power is supplied from power source 18 to driver 15.

Meanwhile, the signals output by the two photocells of photodetector 65 are supplied to differential amplifier 30. Differential amplifier 30 compares these signals, amplifies the difference between the signals, and supplies a signal, which represents this difference, to controller 9 and also to driver 33 through switch 32. Switch 32 is closed or opened by a control signal supplied by controller 9. When switch 32 is closed, the output signal of differential amplifier 30 is input to driver 33. In accordance with the signal supplied from differential amplifier 30 via switch 32, driver 33 supplies a current to drive coil 32 of optical head 6, whereby coil 32 moves objective lens 62, either toward or away from disk 1.

Controller 9 supplies a digital signal to D/A converter 34. D/A converter 34 converts the digital signal into a sawtooth-wave signal (ramp signal). The sawtooth-wave signal is added to the output signal of operational amplifier 33A of driver 33. The output S Current of driver 33 therefore has a sawtooth waveform, and excites drive Coil 63 such that objective lens 62 is moved stepwise, either toward or away from optical disk 1.

Figure 4:
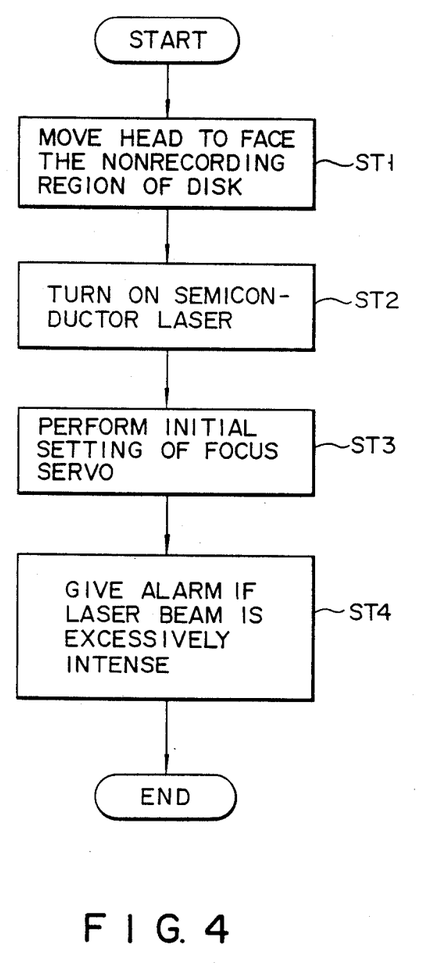
FIG. 4 is a general flow chart explaining the operation of the controller shown in FIGS. 1 and 3.

Controller 9 executes the program shown in FIG. 4, in the form of a flow chart, in the initial operation phase of an apparatus for focusing a light beam onto an information memory medium shown in FIG. 3.

In step ST1, optical head 6 is moved in accordance with the signal output by position detector 8, thereby moving objective lens 62 to face the non-recording region B of optical disk 1. Then, in step ST2, semiconductor laser 7 is turned on, thus emitting a laser beam. In the next step, ST3, objective lens 62 is moved in its axial direction, thus focusing the laser beam onto disk 1 and achieving the initial setting of focus servo. In step ST4, it is determined, from the intensity of the monitor beam emitted from laser 7, whether or not the laser beam being applied to optical disk 1 is excessively intense. If the laser beam is too intense, an alarm is given.

Figure 5:
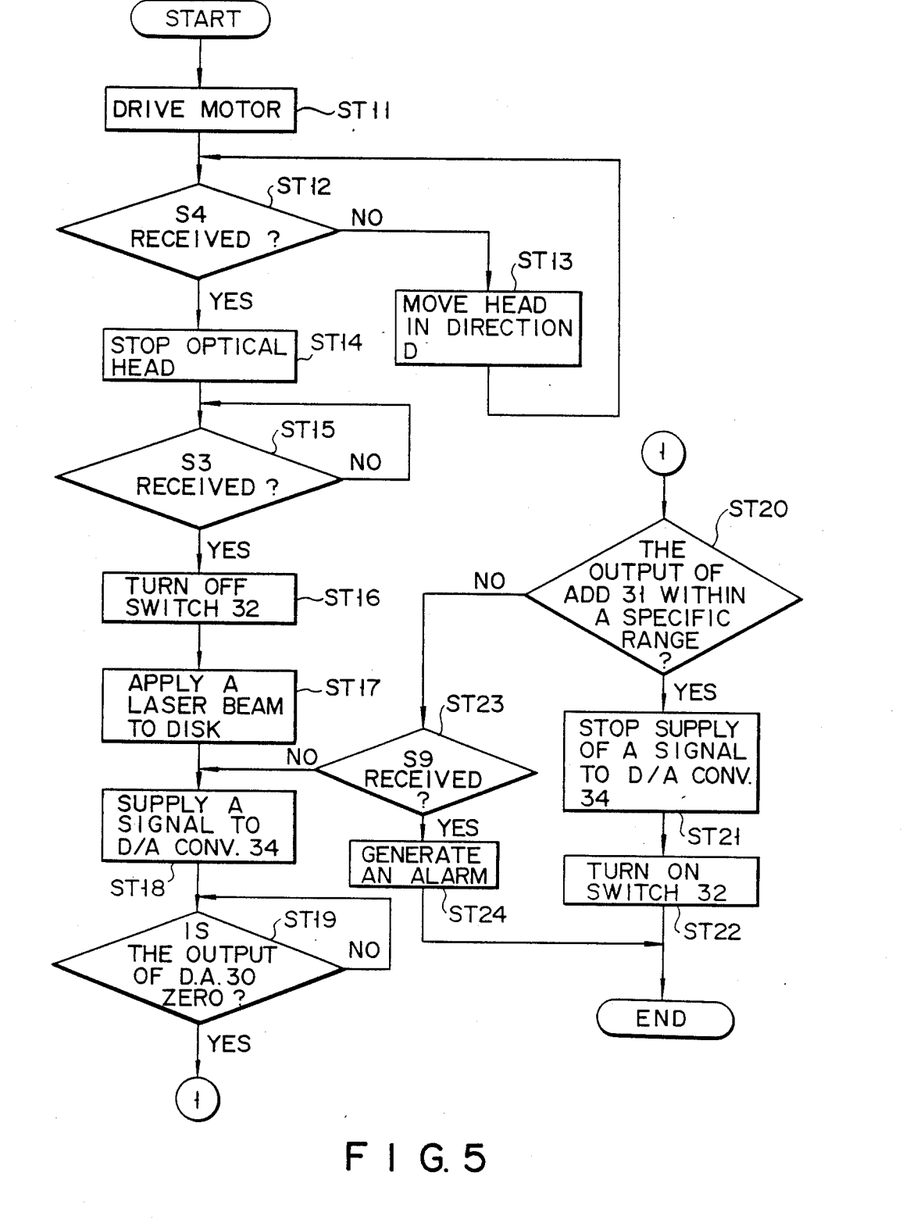
FIG. 5 is a flow chart explaining the operation of the apparatus, in greater detail than the flow chart shown in FIG. 4.

FIG. 5 is a flow chart explaining the operation of controller 9 in detail. With reference to FIG. 5, it will be described how controller 9 perform its function.

First, in step ST11, when the power switch (not shown) is turned on, controller 9 controls motor driver 4. Driver 4 drives spindle motor 2, whereby optical disk 1 is rotated. Then, in step ST12, controller 9 determines whether or not position detector 8 has supplied position signal S4 to controller 9. If NO, the operation goes to step ST13. In step ST13, controller 9 controls head drive mechanism 5. Mechanism 5 moves optical head 6 in the direction of arrow D (FIG. 1) until objective lens 62 of head 6 moves to face first data non-storage region B of optical disk 1, so that detector 8 supplies signal S4 to controller 9. If YES in step ST2, that is, if controller 9 has received position signal S4, the operation goes to step ST14. In step ST14, controller 9 causes head drive mechanism 5 to stop optical head 6. Upon receipt of position signal S4 from position detector 8, controller 9 determines that objective lens 62 faces first data non-storage region B of optical disk 1.

In the next step, step ST15, controller 9 determines whether or not it has received signal S3 from phase comparator 3, which indicates that disk 1 is spinning at the predetermined speed. If YES, controller 9 turns off switch 32 in step ST16. In step ST17, semiconductor laser 7 is energized, thus applying a laser beam onto optical disk 1.

Then, in step ST18, controller 9 supplies the digital signal to D/A converter 34. D/A converter 34 converts this signal into a sawtooth-wave signal. The sawtooth-wave signal is superimposed on the input signal of operational amplifier 33A of driver 33. In other words, it is amplified by driver 33. The amplified sawtooth-wave signal is supplied to drive coil 63 of optical head 6. Coil 63 is energized by this signal, and moves objective lens 62 stepwise, away from optical disk 1 until lens 62 reaches a predetermined position. Then, coil 63 moves lens 62 stepwise, from this position toward optical disk 1.

The beam emitted from laser 7 is applied onto the first data non-storage region B of disk 1 through objective lens 62 thus being moved, first away from disk 1 and then toward disk 1. The beam reflected from region B is applied to photodetector 65 via lens 62, beam splitter 61, and projection lenses 64. The two photocells of photodetector 65 convert the beam into two electric signals, which are supplied to differential amplifier 30 and addition circuit 31. Amplifier 30 outputs a signal representing the difference between the input signals. Addition circuit 31 outputs a signal representing the sum of the input signals. The output signals of both amplifier 30 and addition circuit 31 are supplied to controller 9. In step ST19, controller 9 determines whether not the difference between the two output signals of photodetector 65 is zero or not. If YES, the operation goes to step ST20, in which controller 9 determines whether or not the sum of the output signals of photodetector 65 falls within a prescribed range, indicating that objective lens 62 is in the on-track condition. If YES in step ST20, controller 9 stops supplying the sawtooth-wave signal to D/A converter 34 in step ST21. In step ST22, controller 9 turns on switch 32. Thereafter, a focus servo is performed in accordance with the output signal of differential amplifier 30, which is representative of the difference between the signals generated by the two photocells of photodetector 65.

The output voltage of addition circuit 31, which is proportional to the intensity of the beam reflected from disk 1, is supplied also to comparator 14. Comparator 14 compares this voltage with reference voltage S8, and outputs low-level alarm signal S9 when the output voltage of addition circuit 31 is higher than reference voltage S8. Upon receipt of alarm signal S9, controller 9 generates an alarm in step ST23 and 24. Low-level alarm signal S9 is also supplied to AND gate 16. Control signal S5 for driving laser 7 is supplied to AND gate 16 from controller 9. Hence, AND gate 16 outputs a signal to switch 17, thus turning off switch 17. Control signal S5 is not supplied to driver 15, whereby semiconductor laser 7 stops emitting the laser beam.

As has been described above, in the initial phase of the operation, laser 7 is operated to emit a beam only if objective lens 62 faces the first non-recording region B of optical disk 1. Therefore, should laser drive circuit 10 make an error, causing laser 7 to emit a beam intense enough to destroy the data recorded on disk 1, this beam would be applied to region B, not to the data-storage region A, saving the data recorded in the region A.

Also, has been explained, the focus servo is not performed before head 6 is set to face the first data non-storage region B of disk 1, and before it is determined that disk 1 is spinning at the predetermined speed. Thus, the data recorded on the data-storage region A of disk 1 is safe even if objective lens 62 collides with disk 1 by accident while the focus servo is being performed.

Further, since the focus servo is not carried out before the speed of disk 1 reaches the predetermined value, the beam emitted from laser 7 can be accurately focused on disk 1 even if disk 1 has defects such as pinholes. Were the focus servo carried out before disk 1 starts spinning, the focusing would be "locked" at the defects such as pinholes.

According to the invention, semiconductor laser 7 applies the monitor light to photodetector 11 at the same time laser 7 starts emitting a laser beam. Photodetector 11 instantly converts the monitor light into an electric signal and supplies this signal to differential amplifier 13 through amplifier 12. Differential amplifier 13 compares this signal with reference signal S7, and amplifies the difference between these signals. The output signal of amplifiers 13, which is representative of said difference, is supplied to driver 15. The lower the output voltage of photodetector 11 is than the voltage represented by reference signal S7, the higher the output voltage of differential amplifier 13. Conversely, the higher the output voltage of photodetector 11 is than the voltage represented by signal S7, the lower the output voltage of amplifier 13. Driver 15 converts the input signal into a voltage high enough to drive semiconductor laser 7, and supplies this voltage to laser 7. Laser 7 emits a beam having an intensity corresponding to the voltage output by driver 15. In short, the voltage of monitor signal S6 output by amplifier 12 is controlled to become equal to that of reference signal S7, whereby the intensity of the beam emitted by laser 7 remains constant.

As has been described above, when the intensity of the beam reflected from disk 1 corresponds to a voltage equal to or lower than the voltage of reference signal S8, the intensity of the beam being emitted by laser 7 is maintained at a value determined by reference signal S7. When the intensity of the beam reflected from disk 1 corresponds to a voltage higher than the voltage of reference signal S8, the supply of power to driver 15 is stopped, whereby semiconductor laser 7 stops emitting the beam. Hence, as soon as laser 7 emits too intense a beam, it is prevented from emitting the beam further. The data recorded on disk 1 is therefore saved.

In the case of the embodiment described above, position detector 8 outputs position signal S4 when optical head 6 is moved to face first data non-storage region B of optical disk 1. Instead, detector 8 may produce the position signal when head 6 is moved to a position where it faces second data non-storage region C of disk 1.

In the above embodiment, position detector 8 is comprised of a photo-interrupter. Nonetheless, according to the present invention, detector 8 may be made of a limit switch.

Figure 6:
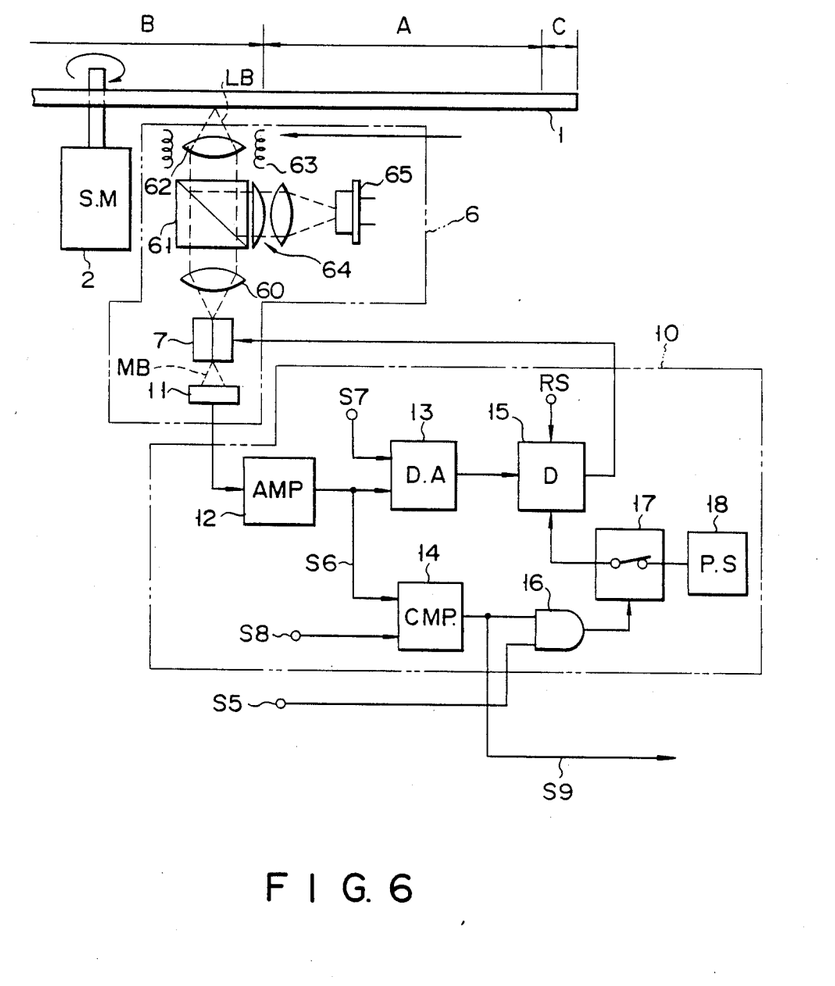
FIG. 6 is a block diagram showing a modified laser drive circuit which can be used in the apparatus shown in FIG. 1.

FIG. 6 is a block diagram showing a modification of laser drive circuit 10. As is illustrated in FIG. 6, the modified circuit 10 is different from circuit 10 shown in FIG. 3, in that the output signal S6 of photodetector 11, which has been amplified by amplifier 12, is applied to one input of comparator 14. Hence, comparator 14 compares voltage S6 with reference signal S8. When the voltage represented by signal S6, which corresponds to the intensity of the monitor light, is higher than the voltage represented by signal S8, comparator 14 outputs an alarm signal S9, thereby causing semiconductor laser 7 to stop emitting the beam. Obviously, the modified laser drive circuit shown in FIG. 6 performs the same function as circuit 10 illustrated in FIG. 3.

What is claimed is:

1. An apparatus for focusing a light beam onto an information memory medium having a data non-storage area, the apparatus comprising:
   means for directing the light beam toward the medium, said directing means including means for generating the light beam;
   means for moving said directing means in a parallel path relative to the medium;
   means for detecting the data non-storage area of the medium during movement of said directing means by said moving means; and
   means for activating said generating means to generate the light beam, when the data non-storage area is detected by said detecting means.

2. An apparatus according to claim 1, further comprising second detecting means for detecting the light beam reflected from the memory medium, and means for disabling said generating means when an output of said second detecting means is greater than a predetermined value.

3. An apparatus according to claim 1, wherein said generating means emits a monitor beam, and the apparatus further comprises second detecting means for detecting the monitor beam emitted by said generating means, and means for disabling said generating means when the output of said second detecting means is greater than a predetermined value.

4. An apparatus for focusing a light beam onto an information memory medium having a data non-storage area, the apparatus comprising:
   means for directing the light beam toward the medium;
   means for moving said directing means in a parallel path relative to the medium
   means for detecting the data non-storage area of the medium during movement of said directing means by said moving means; and
   means for adjusting the location of said directing means with respect to the medium, when the data non-storage area is detected by said detecting means.

5. An apparatus according to claim 4, wherein said directing means includes means for generating the light beam, and the apparatus further comprises second detecting means for detecting the light beam reflected from the memory medium, and means for disabling said generating means when the output of said second detecting means is greater than a predetermined value.

6. An apparatus according to claim 4, wherein said directing means includes means for generating the light beam and a monitor beam, and the apparatus further comprises second detecting means for detecting the monitor beam emitted by said generating means, and means for disabling said generating means when the output of said second detecting means is greater than a predetermined value.

7. An apparatus for focusing a light beam onto an information memory medium having a data non-storage area, the apparatus comprising:
   means for directing the light beam toward the medium, said directing means including means for generating the light beam;
   means for moving said directing means in a parallel path relative to the medium;
   first detecting means for detecting the data non-storage area of the medium during movement of said directing means by said moving means;
   means for activating said generating means to generate the light beam when the data non-storage area is detected by said first detecting means;
   second detecting means for detecting an intensity of the light beam; and
   means for disabling said generating means when the intensity of the light beam detected by the second detecting means is greater than a predetermined value.

8. An apparatus according to claim 7, wherein said generating means emits a monitor beam, and the intensity detector means detects the intensity of the monitor beam emitted by said generating means.

* * * * *

UNITED STATES PATENT AND TRADEMARK OFFICE
CERTIFICATE OF CORRECTION

PATENT NO.   :   4,982,397
DATED        :   January 01, 1991
INVENTOR(S)  :   Tsuneshi Yokota It is certified that error appears in the above-identified patent and that said Letters Patent is hereby corrected as shown below:

Abstract, Line 3, after "not" change "a data" to
--the--;

Abstract, Line 4, after "facing" change "the" to
--a data--.

Signed and Sealed this

First Day of December, 1992

*Attest:*

DOUGLAS B. COMER

*Attesting Officer*   Acting Commissioner of Patents and Trademarks